United States Patent
Song et al.

(10) Patent No.: US 8,271,019 B2
(45) Date of Patent: Sep. 18, 2012

(54) APPARATUS AND METHOD FOR STORING UNREGISTERED PHONE NUMBER IN MOBILE TERMINAL

(75) Inventors: Eun-Ju Song, Yongin-si (KR); Jung-Woog Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 925 days.

(21) Appl. No.: 11/873,881

(22) Filed: Oct. 17, 2007

(65) Prior Publication Data
US 2008/0102884 A1 May 1, 2008

(30) Foreign Application Priority Data
Oct. 25, 2006 (KR) .................. 10-2006-0103839

(51) Int. Cl.
*H04M 1/00* (2006.01)
(52) U.S. Cl. ............ 455/550.1; 455/418; 455/415; 455/412.2; 455/566; 379/93.23; 379/142.06
(58) Field of Classification Search ........... 455/550.1, 455/418, 415, 412.2, 566; 379/355.02–355.05, 379/93.23, 142.06
See application file for complete search history.

(56) References Cited

U.S. PATENT DOCUMENTS

| 6,295,355 | B1 * | 9/2001 | O'Neal et al. ............ 379/355.05 |
| 6,766,017 | B1 * | 7/2004 | Yang ........................ 379/355.02 |
| 2002/0168947 | A1 * | 11/2002 | Lemley ......................... 455/90 |
| 2003/0008636 | A1 * | 1/2003 | McGregor et al. ............. 455/410 |
| 2005/0111645 | A1 * | 5/2005 | Aoyama et al. .......... 379/142.06 |
| 2009/0274142 | A1 * | 11/2009 | Diebel ........................ 370/352 |

\* cited by examiner

*Primary Examiner* — Kathy Wang-Hurst
(74) *Attorney, Agent, or Firm* — The Farrell Law Firm, P.C.

(57) ABSTRACT

Provided is an apparatus and method for storing a phone number in a mobile terminal. The apparatus includes a memory that stores a call history in which an outgoing call number and an incoming call number are listed; a phonebook manger that detects a recent phone number from the call history, checks how many times the detected recent phone number has been used to make a call, and determines whether to store the recent phone number; and a Micro-Processor Unit (MPU) that controls the phonebook manager to determine whether the recent phone number can be stored when the call is ended, and, if information that indicates the recent phone number can be stored is received from the phonebook manager, stores the recent phone number in the memory.

10 Claims, 2 Drawing Sheets

APPARATUS AND METHOD FOR STORING UNREGISTERED PHONE NUMBER IN MOBILE TERMINAL

PRIORITY

This application claims priority under 35 U.S.C. §119(a) to an application filed in the Korean Intellectual Property Office on Oct. 25, 2006 and assigned Serial No. 2006-103839, the contents of which are incorporated herein by reference.

BACKGROUND OF THE INVENTION

1. Field of the Invention

The present invention relates to an apparatus and method for storing a phone number in a mobile terminal, and more particularly, to an apparatus and method for automatically storing a phone number wherein the phone number is unregistered in the mobile terminal and has been used a predetermined number of times.

2. Description of the Related Art

Mobile terminals have become necessities of modern life for people of all ages. Thus, service providers and terminal manufacturers are competitively developing differentiated products (or services).

For example, the mobile terminal has developed into a multimedia device capable of providing various services such as phonebooks, games, short messages, e-mails, wake-up calls, MPEG-1 Audio Layer 3 (MP3) players, digital cameras, and wireless Internet services.

A phonebook function is a value-added function whereby a phone number of a called party to whom a calling party (or user) wants to make a call is dialed in a state that a plurality of phone numbers frequently used are stored in a memory of the mobile terminal, and, whenever needed, the phone number of the calling party is selected from the pre-stored phone numbers. For a user's convenience, the provision of the phonebook function enables the user to easily make a call without having to remember a plurality of phone numbers. Therefore, the phonebook function is used by many users.

Disadvantageously, however, the phonebook function can be used only after the user inputs a phone number to be registered and then presses many menu keys several times, which is inconvenient. As a result, those who are not familiar with the operation of the mobile terminal may miss a time for registering the phone number.

When the user wants to make a call to a phone number to which a previous call is made and which is not registered in the mobile terminal, the user may find the phone number from a recent call log. However, since the recent call log can store only a limited number of phone numbers, the phone number may not exist in the recent call log when the recent call log is updated upon receiving incoming/outgoing call numbers. In this case, the user can neither register the phone number nor use the phone number to make a call.

Accordingly, there is a need for an apparatus and method for automatically storing a phone number in the mobile terminal wherein the phone number is listed in a recent call log (e.g. an outgoing call history) and has been used a predetermined number of times.

SUMMARY OF THE INVENTION

The present invention provides an apparatus and method for automatically storing an unregistered phone number in a mobile terminal.

The present invention also provides an apparatus and method for storing an unregistered phone number in a mobile terminal wherein the unregistered phone number has been received/transmitted more than a predetermined number of times.

According to one aspect of the present invention, there is provided an apparatus for storing an unregistered phone number, including a memory that stores a call history in which an outgoing call number and an incoming call number are listed; a phonebook manger that detects a recent phone number from the call history, checks how many times the detected recent phone number has been used to make a call, and determines whether to store the recent phone number; a Micro-Processor Unit (MPU) that controls the phonebook manager to determine whether the recent phone number can be stored when the call is ended, and, if information that indicates the recent phone number can be stored is received from the phonebook manager, stores the recent phone number in the memory.

According to another aspect of the present invention, there is provided a method of storing an unregistered phone number in a mobile terminal, including after ending a call, checking how many times a recent phone number has been used to make a call from a call history and determining whether the recent phone number can be stored; and if the determination result shows that the recent phone number can be stored, storing the recent phone number.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Definitions of terminology used herein should be determined in consideration of functionality of the present invention, and the terminology may vary depending on a user's or an operator's intention, or customs in the art. Therefore, corresponding definitions should be determined with reference to the entire pages of the specification.

An apparatus and method is provided for automatically storing a phone number in a mobile terminal wherein the phone number has been used a predetermined number of times and is listed in a call history. Examples of the mobile terminal include a cellular phone, a Personal Communication System (PCS) phone, a Personal Digital Assistant (PDA), an International Mobile Telecommunication-2000 (IMT-2000) phone, and a Fourth Generation (4G) broadband system phone. Hereinafter, a general configuration of the mobile terminal will be described.

The phone number is an incoming/outgoing call number that is not registered in the mobile phone by a user. It is possible to check how many times the outgoing call number or the incoming call number has been used. In addition, regardless of whether the phone number is the outgoing call number or the incoming call number, it is possible to check how many times a phone number, to which a call is made, has been used. Then, the phone number is automatically stored.

Figure 1:
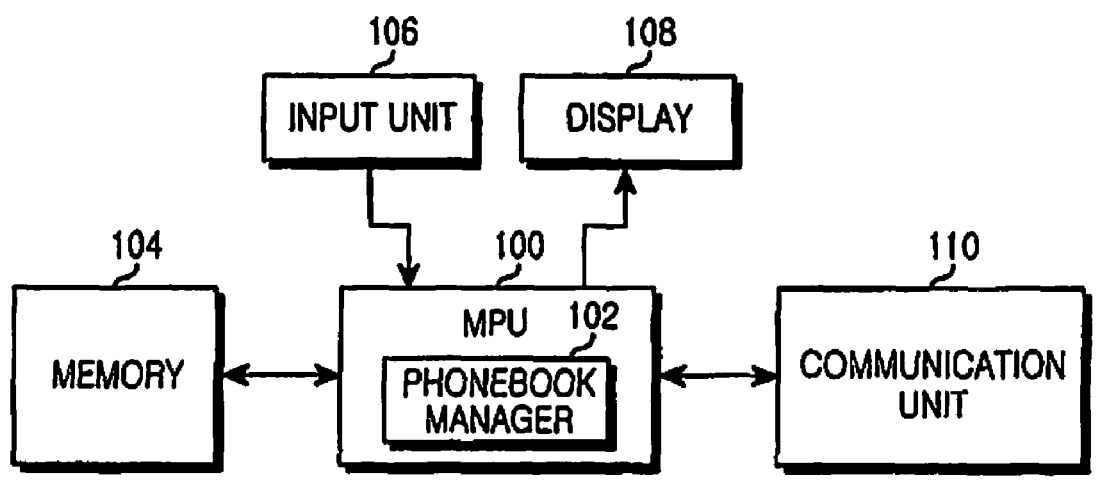
FIG. 1 is a block diagram of a structure of a mobile terminal for storing an unregistered phone number in a mobile terminal according to the present invention.

FIG. 1 is a block diagram of a structure of a mobile terminal for storing an outgoing call number that has been used a predetermined number of times according to the present invention.

Referring to FIG. 1, the mobile terminal includes a Micro-Processor Unit (MPU) 100, a memory 104, an input unit 106, a display 108, and a communication unit 110. The MPU 100 may include a phonebook manager 102.

The phonebook manager 102 may operate under the control of the MPU 100. However, the phonebook manager 102 is separately constructed in the present invention. This is an example to distinctively describe functions of the phonebook manager 102 and the MPU 100. In practice, however, the MPU 100 may also perform the functions of the phonebook manager 102.

The MPU 100 controls overall operations of the mobile terminal. For example, voice call or data communication is processed and controlled by the MPU 100. Further, in addition to a general operation, when the user hangs up a call in a state that a dialed phone number is not registered in the mobile phone, the MPU 100 controls the phonebook manager 102 to determine whether a requirement for storing the phone number is satisfied.

If the phonebook manager 102 determines that the requirement is satisfied, the MPU 100 checks a store-mode that is set in the portable terminal. If the store-mode is an automatic store-mode, the phone number is stored by creating setting information under the control of the MPU 100. On the other hand, if the store-mode is a manual store-mode, the MPU 100 controls the display 108 to display a screen for setting store-information.

The phonebook manager 102 searches a call information database in the memory 104 under the control of the MPU 100 and determines whether the requirement for storing the phone number is satisfied. A determination result is provided to the MPU 100.

The memory 104 includes a Read Only Memory (ROM), a Random Access Memory (RAM), and a flash ROM. The ROM stores a microcode of a program, by which the MPU 100 is processed and controlled, and a variety of reference data.

The RAM is a working memory of the MPU 100 and stores temporary data that is generated while programs are performed. The flash ROM stores rewritable data, such as phonebook entries, outgoing messages, and incoming messages.

The input unit 106 includes a plurality of function keys such as numeral key buttons of '0' to '9', a menu button, a cancel (or delete) button, an OK button, a talk button, an end button, an Internet access button, a navigation (or direction) key button, and a character input key. Key input data, which is input when the user presses these keys, is provided to the MPU 100.

The display 108 displays information such as state information, which is generated while the mobile terminal operates, limited numeral characters, large-sized moving pictures, phone number information, etc. The display 108 may be a color Liquid Crystal Display (LCD).

The communication unit 110 transmits/receives a Radio Frequency (RF) signal of data that is input/output through an antenna (not shown). For example, in a transmitting process, data to be transmitted is subject to a channel-coding process and a spreading process, and then the data is transformed to an RF signal. In a receiving process, the RF signal is received and transformed to a base-band signal, and the base-band signal is subject to a de-spreading process and a channel-decoding process, thereby restoring the data.

Now, a method of storing an unregistered phone number using the aforementioned apparatus according to the present invention will be described.

Figure 2:
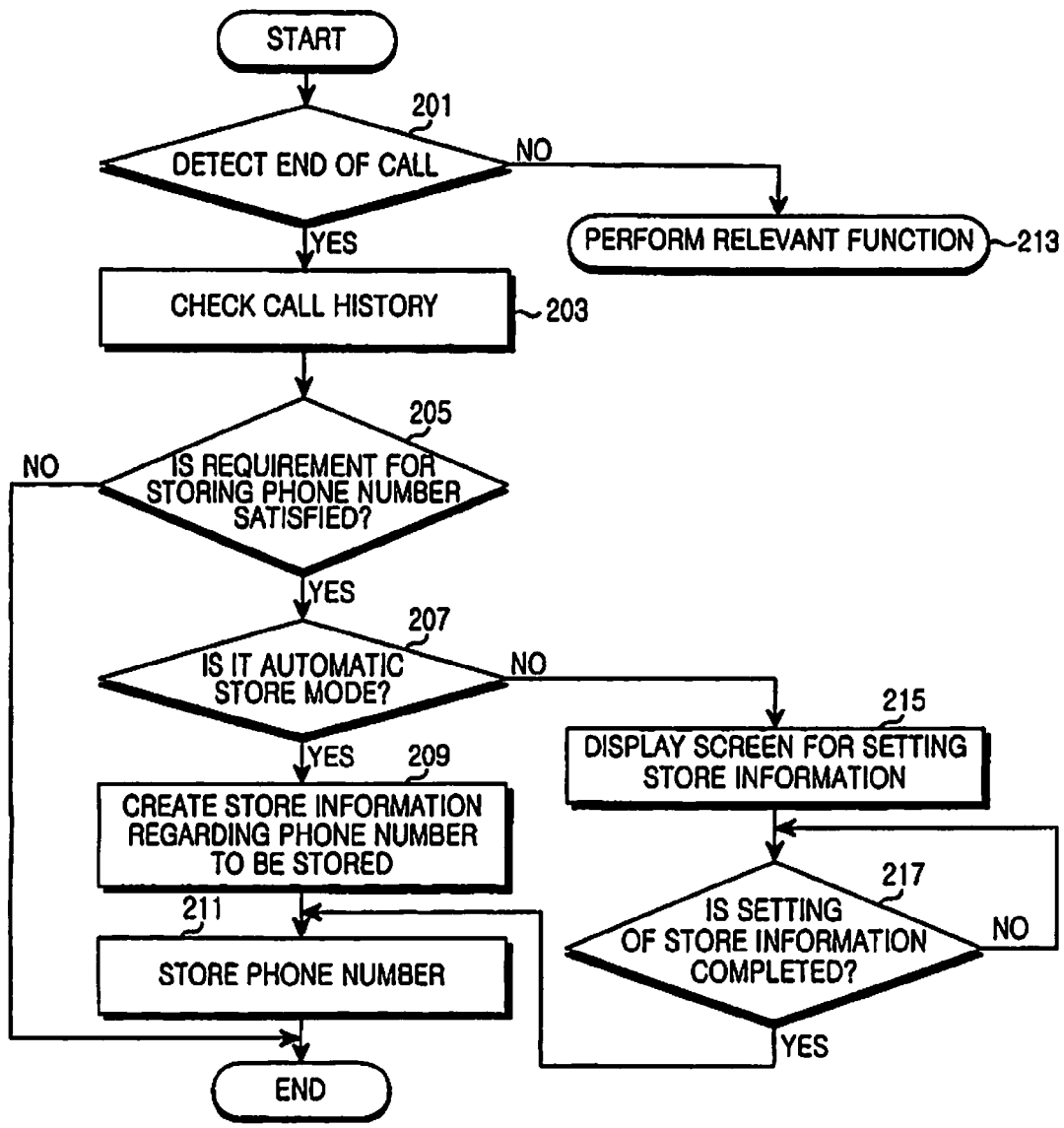
FIG. 2 is a flowchart of a method for storing an unregistered phone number in a mobile terminal according to the present invention.

FIG. 2 is a flowchart of a method for storing an unregistered phone number in a mobile terminal according to the present invention.

Referring to FIG. 2, the MPU 100 detects an end of a call that is made by the user, in step 201. Herein, it will be assumed that the user made a call to a phone number that is not registered in the mobile terminal.

If the end of a call is not detected, the MPU 100 performs a relevant function (e.g. maintaining a call connection), in step 213.

Otherwise, the MPU 100 allows the phonebook manager 102 to check a call history of the mobile terminal, in step 203.

In this case, the call history may be an outgoing call history or an incoming call history such as a recent call log. In order to check the call history, the phonebook manager 102 may search the call information database in the memory 104 under the control of the MPU 100.

Thereafter, the MPU 100 allows the phonebook manager 102 to determine whether a requirement for automatically storing the phone number is satisfied, in step 205. In this step, under the control of the MPU 100, the phonebook manager 102 may check how many times the phone number that is used to make a call in step 201 has been stored (i.e. the number of times of calling) among a plurality of phone numbers listed in the call history. Thus, whether the requirement is satisfied may be determined.

That is, if the phone number has been stored more than a predetermined number of times in the call history, the phonebook manager 102 recognizes that the phone number is frequently used even if it is not registered in the mobile terminal. Thus, the phonebook manager 102 may determine that the requirement for storing the phone number is satisfied. Otherwise, the phonebook manager 102 may determine that the requirement is not satisfied.

If the phonebook manager 102 determines in step 205 that the requirement is satisfied, the MPU 100 checks a store-mode for the phone number, in step 207.

The store-mode may be either a manual store-mode or an automatic store-mode, and is selected according to a user's preference. In the manual store-mode, a name corresponding to the phone number is directly input by the user so as to be stored. In the automatic store-mode, the name corresponding to the phone number is stored with an arbitrary name (e.g. unregistered-01, unregistered-02, etc) in the mobile terminal.

If the manual store-mode is detected in step 207, the MPU 100 controls the display 108 to display a screen for setting store-information, in step 215. The screen may display a phone number to be stored, a name of a user whose mobile terminal is assigned with the phone number, a group in which the phone number is included, etc.

Next, the MPU 100 determines whether the setting of the store-information has been completed, in step 217.

If the completion of the setting is detected in step 217, the MPU 100 stores the phone number, in step 211. As a result, the phonebook stored in the memory 104 is updated.

On the other hand, if the automatic store-mode is detected in step 207, the MPU 100 creates store-information regarding the phone number to be stored, in step 209. For example, if the phone number is stored in the phonebook, the store-information may be an arbitrary name (e.g. "unregistered-01", "unregistered-02", etc) so that the phone number can be searched for by the user at a later time.

Before the phone number is stored in the automatic store-mode or the manual store-mode, the MPU 100 may output a message showing that the phone number will be subject to a store process, so that the user can determine whether to store the phone number.

After the store-information is created in step 209, the MPU 100 stores the phone number, in step 211. Then, the phonebook stored in the memory 104 is updated, thereby ending the procedure.

According to the present invention, a phone number, which is listed in a call history providing a recent call log of a mobile terminal and has been used more than a predetermined number of times, is automatically stored. Therefore, a conventional problem can be solved in which a phone number cannot be registered when the phone number is listed in the recent call log but cannot be found because the recent call log has been updated upon receiving of other phone numbers.

Alternate embodiments of the present invention can also comprise computer readable codes on a computer readable medium. The computer readable medium includes any data storage device that can store data that can be read by a computer system. Examples of a computer readable medium include magnetic storage media (such as Read-Only Memory (ROM), floppy disks, and hard disks, etc.), optical recording media (such as Compact Disc (CD)-ROMs or Digital Versatile Discs (DVDs)), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An apparatus for storing an unregistered phone number, the apparatus comprising:
    a memory that stores a call history in which outgoing call numbers and incoming call numbers are listed;
    a phonebook manger that detects a recent unregistered phone number from the call history, checks how many times the detected recent unregistered phone number has been used to make a call, and determines whether to store the recent unregistered phone number; and
    a Micro-Processor Unit (MPU) that controls the phonebook manager to determine whether the recent unregistered phone number can be stored when the call is ended,
    wherein the MPU checks a default store-mode to determine whether a manual store mode is set or an auto store mode is set,
    wherein, when in the manual store mode, a name corresponding to a phone number is directly input by the user for storing,
    wherein, when in the auto store mode, the name corresponding to the phone number is stored with an arbitrary name, and
    wherein, if a result of the checking shows that the default store-mode is the manual store-mode and if information that indicates the recent unregistered phone number can be stored is received from the phonebook manager, the MPU controls a display to display a screen for a user to directly input information related to the recent unregistered phone number, regardless of whether the recent unregistered phone number is an outgoing call number or an incoming call number.

2. The apparatus of claim 1, wherein the MPU controls the phonebook manager to store in the memory the recent unregistered phone number with the directly input information, which includes a name of the user of the recent unregistered phone number.

3. A method of storing an unregistered phone number in a mobile terminal, the method comprising the steps of:
    after ending a call, checking by a phone manager how many times a recent unregistered phone number has been used to make calls from a call history and determining whether the recent unregistered phone number can be stored;
    checking a default store-mode to determine whether a manual store mode is set or an auto store mode is set,
    wherein, when in the manual store mode, a name corresponding to a phone number is directly input by the user for storing, and
    wherein, when in the auto store mode, the name corresponding to the phone number is stored with an arbitrary name; and
    if a determination result shows that the recent unregistered phone number can be stored and if the default store-mode is the manual store-mode, displaying a screen for a user to directly input information related to the recent unregistered phone number,
    wherein a determination is made of whether the recent unregistered phone number can be stored is made when the call is ended, regardless of whether the recent unregistered phone number is an outgoing call number or an incoming call number.

4. The method of claim 3, further comprising storing the recent unregistered phone number and the information received from the user in memory.

5. The method of claim 3, wherein the displaying of the screen is performed using a popup window.

6. An apparatus for storing an unregistered phone number in a mobile terminal, comprising:
    means for checking how many times a recent unregistered phone number has been used to make calls;
    means for determining whether the recent unregistered phone number can be stored;
    means for checking a default store-mode to determine whether a manual store mode is set or an auto store mode is set; and
    means for displaying a screen for a user to directly input information related to the recent unregistered phone number, wherein a determination of whether the recent unregistered phone number can be stored and whether a default store-mode is the manual store-mode is made when the call is ended, regardless of whether the recent unregistered phone number is an outgoing call number or an incoming call number,
    wherein, when in the manual store mode, a name corresponding to a phone number is directly input by the user for storing, and
    wherein, when in the auto store mode, the name corresponding to the phone number is stored with an arbitrary name.

7. The apparatus of claim 6, further comprising means for storing the recent unregistered phone number and the information received from the user in the memory.

8. A non-transitory computer-readable recording medium having recorded thereon program for storing an unregistered phone number in a mobile terminal, comprising
- a first code segment, for checking how many times a recent unregistered phone number has been used to make calls;
- a second code segment, for determining whether the recent unregistered phone number can be stored;
- a third code segment, for checking a default store-mode to determine whether a manual store mode is set or an auto store mode is set;
- a fourth code segment, for displaying a screen for a user to directly input information related to the recent unregistered phone number; and
- a fifth code segment, for storing the recent unregistered phone number and the information received from the user in the mobile terminal,
- wherein a determination is made of whether the recent unregistered phone number can be stored is made when the call is ended and whether a default store-mode is a manual store-mode, regardless of whether the recent unregistered phone number is an outgoing call number or an incoming call number,
- wherein, when in the manual store mode, a name corresponding to a phone number is directly input by the user for storing, and
- wherein, when in the auto store mode, the name corresponding to the phone number is stored with an arbitrary name.

9. The apparatus of claim 1, wherein the phonebook manger determines whether to store the recent unregistered phone number by identifying whether the number of calls to which the recent phone number has been used to make exceeds a threshold number.

10. The method of claim 3, wherein the step of determining whether the recent unregistered phone number can be stored is performed by identifying whether the number of times the recent phone number has been used to make a call exceeds a threshold number.

* * * * *